United States Patent
Hillyard (10) Patent No.: US 8,971,807 B2
(45) Date of Patent: Mar. 3, 2015

(54) SYSTEMS AND METHODS FOR LOW POWER SHORT RANGE WIRELESS DEVICE COMMUNICATION ADVERTISEMENT

(75) Inventor: Jason Edward Robert Hillyard, San Diego, CA (US)

(73) Assignee: Wicentric, Inc., San Diego, CA (US)

( * ) Notice: Subject to any disclaimer, the term of this patent is extended or adjusted under 35 U.S.C. 154(b) by 586 days.

(21) Appl. No.: 13/209,364

(22) Filed: Aug. 12, 2011

(65) Prior Publication Data

US 2013/0040573 A1    Feb. 14, 2013

(51) Int. Cl.
*H04B 7/00*    (2006.01)
*H04W 8/00*    (2009.01)
*H04W 84/18*   (2009.01)

(52) U.S. Cl.
CPC .............. *H04W 8/005* (2013.01); *H04W 84/18* (2013.01)
USPC ........................................ 455/41.2; 455/41.1

(58) Field of Classification Search
CPC ...... H04W 74/00; H04W 84/18; H04W 8/005
See application file for complete search history.

(56) References Cited

U.S. PATENT DOCUMENTS

| 8,526,976 B1 * | 9/2013 | Vargantwar et al. ......... 455/458 |
| 2010/0054146 A1 * | 3/2010 | Rudland et al. ............... 370/252 |
| 2011/0274021 A1 * | 11/2011 | He et al. ........................ 370/311 |
| 2012/0182966 A1 * | 7/2012 | Das et al. ...................... 370/331 |
| 2012/0328061 A1 * | 12/2012 | Chow ............................ 375/354 |

* cited by examiner

*Primary Examiner* — Fayyaz Alam
*Assistant Examiner* — Mohammed Rachedine
(74) *Attorney, Agent, or Firm* — Kang S. Lim (57) ABSTRACT

The present invention relates to a system and method for improving directed connectable advertising in a low energy Bluetooth device. The host on the Bluetooth device configures an advertisement interval length, an advertisement window length, and a number of attempts. The advertisement window length is equal to or shorter than the advertisement interval length, which may be less than 1.28 seconds. Next, advertising packets are transmitted for the length of the advertising window on three advertising channels. Packets are transmitted consecutively, with no more than a 3.75 millisecond delay between packets, until the end of the advertisements window. After transmitting, a link layer of the Bluetooth device decrements the number of attempts. Once all attempts have been exhausted, the advertisements end. Otherwise, the link layer waits for the end of the advertisement interval. The link layer generates a pseudorandom delay between 0 and 10 milliseconds, and waits for this time to pass before initiating another advertisement interval with transmission during the advertisement window. If a connection is made at any point, the advertisement may be ended.

20 Claims, 9 Drawing Sheets

SYSTEMS AND METHODS FOR LOW POWER SHORT RANGE WIRELESS DEVICE COMMUNICATION ADVERTISEMENT

BACKGROUND

This invention relates generally to mechanism for low power, short range wireless device communication. Such a system improves upon existing proposed Bluetooth low-energy specifications. In particular, the present invention relates to systems and methods for improving directed connectable advertising, and improved scanning by Bluetooth devices. Such systems and methods provide a number of benefits, including more rapid connectivity between devices, and accordingly a much lower power consumption rate. This enables devices to run for extended periods of time, or reduces the size of the power source required by these devices.

Bluetooth is an open wireless technology standard for short distance device communication. Bluetooth devices use short wavelength radio transmissions in the Industrial, Scientific and Medical (ISM) channel from 2400-2480 MHz. Bluetooth uses frequency-hopping spread spectrum, which chops up data into chunks which are then transmitted on up to 79 channels, each 1 MHz (for classical Bluetooth) or 40 channels, each 2 MHz (for low energy Bluetooth) centered from 2402 to 2480 MHz. Bluetooth is a packet based protocol with a master-slave structure. The master may communicate with multiple slaves and each device shares the master device's clock.

Bluetooth technology has changed and adapted as consumer demands have evolved. "Classical Bluetooth technology" typically refers to Bluetooth Version 2.1+EDR (Enhanced Data Rate) and Version 3.0+HS (High Speed) specifications. Recently Bluetooth low energy specifications have been introduced. Classical Bluetooth technology and low energy technology share a number of commonalities: they are both low cost, short range, interoperable robust wireless technologies. However, there is a critical difference between these technologies, Bluetooth low energy is designed as an ultra low power (ULP) technology.

Many modern devices require a very long service life without battery replacement. Others have limited size or weight availability, thereby requiring reduced power supplies. Thus there is a consistent and powerful drive toward minimizing power load requirements in these devices. Bluetooth low energy was designed to meet some of these needs. This enables a new class of low cost Bluetooth products with very long battery life, such as fitness sensors, proximity key fobs, and wireless watches.

Bluetooth low energy enables devices to be aware of one another but not be connected most of the time. In some modes of operation, only when absolutely necessary do the devices link to one another, and then the connection is maintained for as short a duration as possible. In other modes of operation, Bluetooth low energy is also capable of connections of longer duration, more similar to that of classical Bluetooth. Classical Bluetooth technology is connection oriented, with a fixed connection interval. This is ideal for high activity connections, such as mobile phone linkage to a headset. However, such an active connection requires more frequent transmissions, which drains power at a much faster rate.

Bluetooth low energy technology is ideally suited for the transmission of data from compact wireless sensors, or other peripherals, where fully asynchronous communication can be utilized. These devices send low volumes of data (i.e., a few bytes) infrequently (i.e., a few times a second at most).

Bluetooth low energy employs two multiple access schemes: Frequency Division Multiple Access (FDMA) and Time Division Multiple Access (TDMA). Forty physical channels, separated by 2 MHz, are used in the FDMA scheme. Three of these channels are used as advertising channels, and the remaining 37 are used as data channels.

The physical channel is sub-divided into time units known as events. Data is transmitted between low energy devices in packets that are positioned in these events. There are two types of events: Advertising and Connection events. This application will be centered about advertising events and as such, for the sake of clarity, the discussion will center about this event.

Devices that transmit advertising packets on the advertising physical channels are referred to as "advertisers". Devices that receive advertising on the advertising channels without the intention to connect to the advertising device are referred to as "scanners". Transmissions on the advertising physical channels occur in advertising events. At the start of each advertising event, the advertiser sends an advertising packet corresponding to the advertising event type. Depending on the type of advertising packet, the scanner may make a request to the advertiser on the same advertising physical channel which may be followed by a response from the advertiser on the same advertising physical channel. The advertising physical channel changes on the next advertising packet sent by the advertiser in the same advertising event. The advertiser may end the advertising event at any time during the event. The first advertising physical channel is used at the start of the next advertising event.

An advertiser uses an advertising procedure to perform unidirectional broadcasts to devices in the area. The unidirectional broadcast occurs without a connection between the advertising device and the listening devices. The advertising procedure can be used to establish connections with nearby initiating devices or used to provide periodic broadcast of user data to scanning devices listening on the advertising channel. The advertising procedure uses the advertising physical channel for all advertising broadcasts.

Correspondingly, a scanning device uses a scanning procedure to listen for unidirectional broadcasts of user data from advertising devices using the advertising physical channel. A scanning device can request additional user data from an advertising device by making a scan request over the advertising physical channel.

Bluetooth devices use the advertising procedure and scanning procedure to discover nearby devices, to be discovered by devices in a given area, or to form a connection with another Bluetooth device. The discovery procedure and connection procedure are both asymmetrical. A first Bluetooth device needs to listen for devices advertising scannable or connectable advertising events, while another Bluetooth device is actively broadcasting scannable or connectable advertising events over the advertising broadcast physical channel. For more information on low energy Bluetooth see "Bluetooth Specification Version 4.0 [Vol 0]", published Jun. 30, 2010, which is hereby incorporated by reference.

While current low energy Bluetooth protocol goes a long way in reducing the required energy used to establish connections, there is always a demand to further reduce power usage, reduce the connection establishment time, ensure more consistent connection establishment, and provide flexibility scheduling advertising transmissions. In particular, it would be highly advantageous to be able to optimize the advertising protocol and scanning protocol to ensure fewer advertising transmissions and more rapid connection establishment as these will limit the amount of time a device is utilizing the radio frequency (RF) transceiver (the largest burden on power consumption). The advertising may also be enabled to periodically transmit for longer time periods than traditional modes of operation, therefore increasing connection establishment reliability. Further, if these optimizations may be effectuated without unduly complicating the Bluetooth devices, or increasing component costs, and be backwards compatible with Bluetooth 4.0 specifications, such optimizations to further reduce power requirements would be of particular value.

It is therefore apparent that an urgent need exists for a system and method for improving low power short range wireless communications. In particular, the need exists to optimize the advertising and scanning procedures of low power Bluetooth devices to further reduce power consumption through more efficient connections. Such a system and method would enable devices to run longer or have a smaller power source, thereby reducing user need for replacement of power (increased convenience) and enabling smaller and lighter wireless devices.

SUMMARY

To achieve the foregoing and in accordance with the present invention, a system and method for improving directed connectable advertising in a low energy Bluetooth device is provided. Such a system and method reduces overall duty cycle for the transceiver, thereby reducing overall power consumption.

In some embodiments, the host on the Bluetooth device is able to configure an advertisement interval length, an advertisement window length, and a number of attempts. The advertisement window length is equal to or shorter than the advertisement interval length. Further, the advertisement interval length may be less than 1.28 seconds in some embodiments.

Next, advertising packets are transmitted for the length of the advertising window. Packets are transmitted via a transceiver in the Industrial, Scientific and Medical (ISM) frequency range on up to three advertising channels. Packets are transmitted consecutively, with no more than a 3.75 millisecond delay between packets, until the end of the advertisements window. After transmitting, the link layer of the Bluetooth device decrements the number of attempts. Once all attempts have been exhausted, the advertisements end. Otherwise, the link layer waits for the end of the advertisement interval.

The link layer generates a pseudorandom delay between 0 and 10 milliseconds, and waits for this time to pass before initiating another advertisement interval with transmission during the advertisement window. If a connection is made at any point, the advertisement may be ended. Otherwise, the process can cycle between transmitting during the advertisement window and waiting for the end of the advertisement interval and pseudorandom delay until the attempt number is reached.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to a system and methods for short range wireless communication based upon Bluetooth low energy specifications. The novel aspects of embodiments relate to unique mechanisms for advertisement and scanning which increase the likelihood of establishing a connection. This results in shorter advertisement and scanning, reducing overall transceiver usage, increasing connection establishment reliability, and thereby reducing overall power consumption over known low energy Bluetooth protocols.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Low Energy Bluetooth Overview

Devices using Bluetooth low energy wireless technology are expected to consume a fraction of the power of classic Bluetooth enabled products. In many cases, products will be able to operate more than a year on a button cell battery without recharging or replacement.

Bluetooth low energy wireless technology operates in the same spectrum range (2402-2480 MHz) as classic Bluetooth, but uses a different set of channels. Instead of classical Bluetooth which uses 79 1 MHz wide channels, Bluetooth low energy has 40 2 MHz wide channels.

Bluetooth low energy may be implemented in two alternative ways: single or dual mode. Single mode enables devices to benefit from low power consumption, which is ideal for highly integrated and compact devices like sports sensors, watches and tags. In dual-mode implementations, Bluetooth low energy functionality is integrated into Classic Bluetooth circuitry. The architecture shares the radio and antenna with Classic Bluetooth technology, and further enhances circuits with the new low energy stack, thereby enhancing the development of Classic Bluetooth devices with new capabilities.

Figure 1:
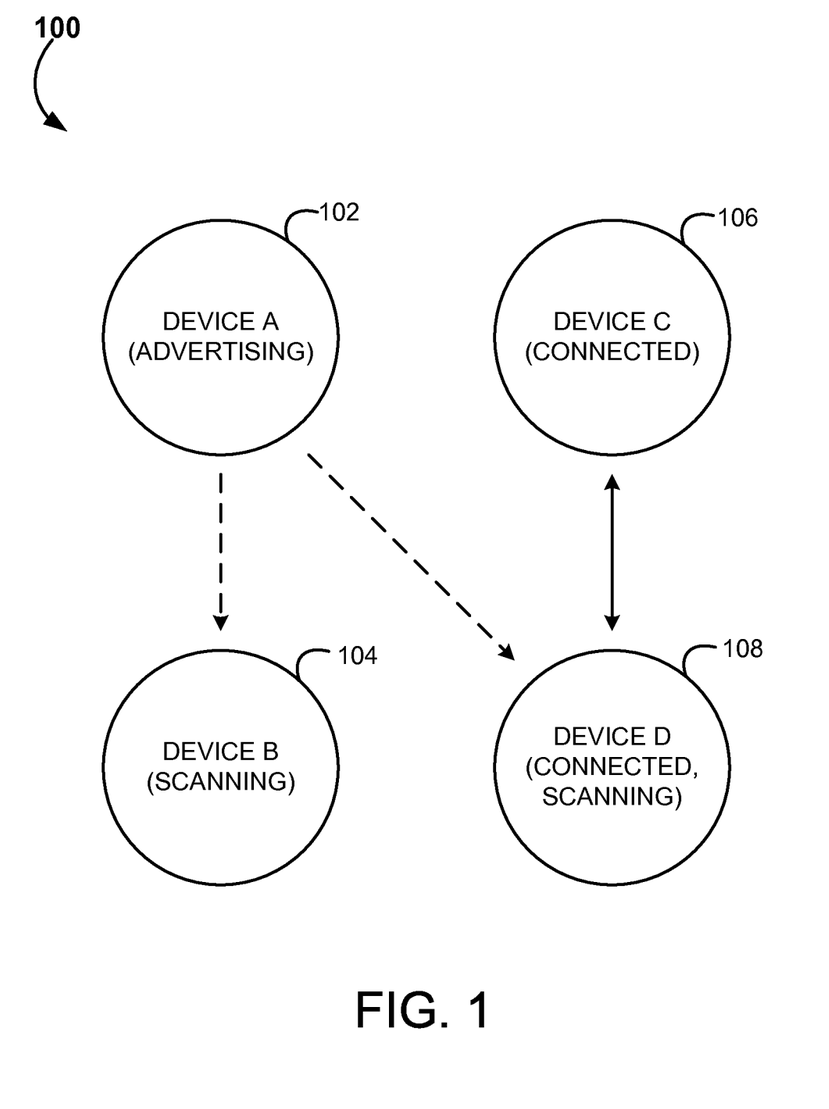
FIG. 1 is an example illustration representing four low energy Bluetooth devices engaging in various communication procedures, in accordance with some embodiments.

To facilitate discussion, FIG. 1 illustrates multiple devices communicating using Bluetooth low energy technology, shown at 100. The devices shown in the present example illustration are intended to be any low energy compatible devices. This may include personal computers, peripheral hardware, sensors, controllers, and any other suitable devices. The exact nature of these devices is left amorphous in order to not unnecessarily obscure the scope of the disclosed embodiments.

As previously noted, low energy Bluetooth technology utilizes 40 channels, each 2 MHz, in the Industrial, Scientific and Medical (ISM) spectrum. Three (3) of these 40 channels are reserved as advertising channels by the low energy Bluetooth specification. The remaining 37 channels are used for data channels.

Device A 102 is known as an "advertiser". This device 102 is transmitting advertisement packets (i.e., advertising) for the purpose of discovery of connectivity by another low energy Bluetooth enabled device. These advertising packets are transmitted on the 3 advertising channels. These advertisement packets are received by Devices B 104 and D 108, which are scanning Devices which are scanning listen for incoming advertisement packets on the advertising channels.

A bidirectional data channel is connected between devices C 106 and D 108. These devices are aware of one another and are utilizing one of the 37 data channels to communicate data. Device D 108 is receiving advertisements from Device A 102 while simultaneously connected to Device C 106 in this example embodiment.

Figure 2:
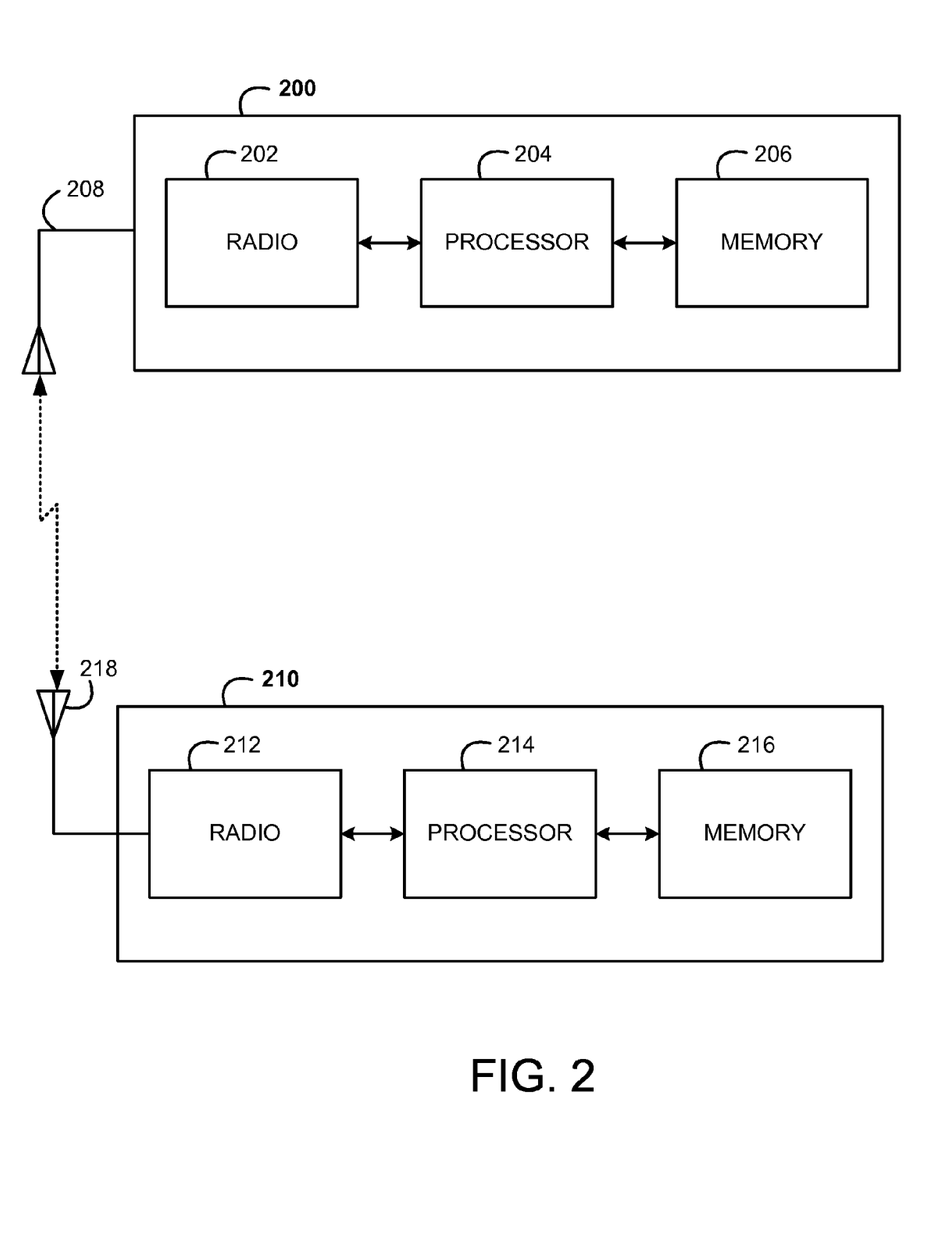
FIG. 2 is an example block diagram of the hardware architecture of a pair of Bluetooth low energy devices, in accordance with some embodiments.

FIG. 2 illustrates an example hardware implementation of a pair of Bluetooth low energy devices 200 and 210 respectively, according to some embodiments. In the first device 200, the processor 204 executes software and manipulates data stored in a memory 206. Memory 206 can include optical memory, hard drive or solid state memory source. In some embodiments, the processor 204 may be a plurality of processor units. Likewise, in some embodiments, the memory 206 may include a combination of multiple memory sources, such as solid state random access memory, and a hard drive.

The application, host protocol stack, and link layer software are stored in memory 206 and may be executed on the processor 204. Specifics of these modules will be discussed in greater detail in the following figure. The processor 204 interfaces to a radio 202 that that transmits and receives Bluetooth low energy RF signals via an antenna 208 to the antenna 218 of the second device 210. The second Bluetooth enabled device 210 includes similar hardware and operations as the first Bluetooth device 200.

Current Bluetooth architecture includes the processor 204, memory 206, radio 202 and antenna 208, thus improving advertising or scanning procedures may be readily incorporated into existing low energy devices with relatively minor adjustments to the host and link layer stored within the memory 206.

Figure 3:
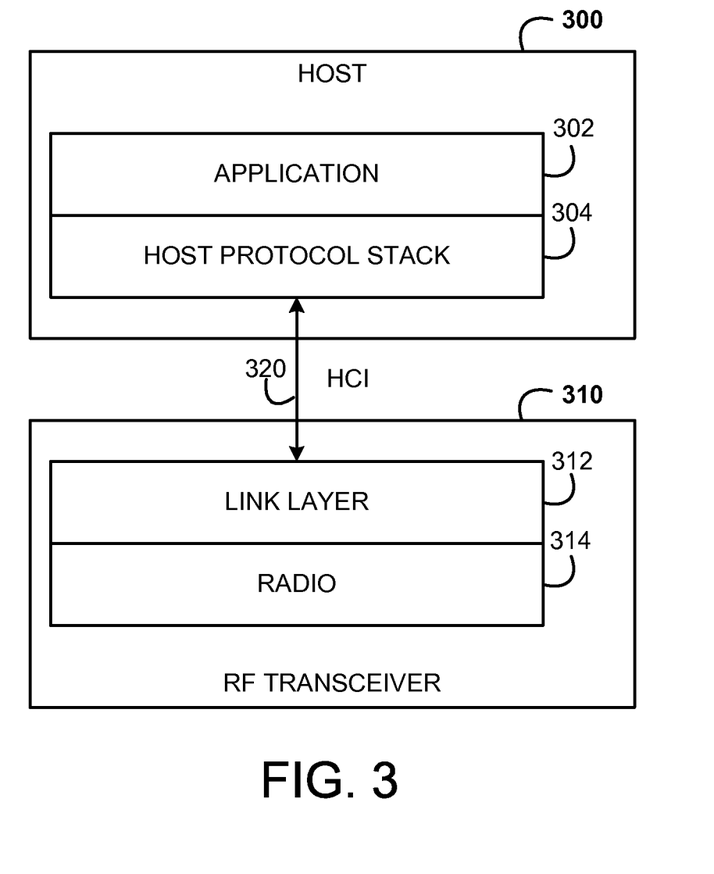
FIG. 3 is an example block diagram of the system architecture of a Bluetooth low energy device, in accordance with some embodiments.

FIG. 3 illustrates the software and system architecture of a Bluetooth low energy device according to some embodiments. In this example embodiment, the device consists of a host 300 and RF (radio frequency) transceiver 310. The host 300 consists of an application 302 for controlling the overall operation of the device and a host protocol stack 304 which implements the host layer protocols for Bluetooth low energy defined by the Bluetooth low energy specification.

The RF transceiver 310 consists of link layer software 312 which implements the link layer protocol defined by the Bluetooth low energy specification. It also consists of a radio 314 which implements the physical layer defined by the Bluetooth low energy specification. The link layer 312 receives commands from the host protocol stack to perform various procedures such as advertising, scanning, and establishing connections. The link layer 312 interfaces to the radio 314 to transmit and receive Bluetooth low energy RF signals.

The host 300 communicates with the RF transceiver 310 over a link using the HCI protocol 320 defined by the Bluetooth specification. In some devices, the host 300 and RF transceiver 310 may be separate hardware components and this link may be a hardware interface such as UART or SPI. In some devices the host 300 and RF transceiver 310 may be contained in a single hardware component and this link may be a software interface, such as a message passing interface, in some embodiments.

II. Improved Directed Connectable Advertising

There are three characteristics of low energy Bluetooth technology that underlie its ultra low power performance: 1) maximized standby time, 2) fast connection, and 3) low peak transmit/receive power. Switching the radio "on" for anything other than very brief periods dramatically reduces battery life, so any transmitting or receiving that has to be done needs to be done quickly. One method that current low energy Bluetooth technology employs to minimize transceiver usage time is to employ only three channels, as previously discussed, to search for other devices or promote its own presence to devices that might be looking to make a connection. In comparison, Classic Bluetooth technology uses 32 channels.

As such, low energy Bluetooth technology has to utilize the transceiver for just 0.6 to 1.2 ms to scan for other devices, while Classic Bluetooth technology requires 22.5 ms to scan its 32 channels. Consequently, low energy Bluetooth technology uses 10 to 20 times less power than Classic Bluetooth technology to locate other radios (at the expense of robustness).

Once connected, the low energy Bluetooth devices may switch to one of the 37 data channels. During the short data transmission period, the radio switches between channels sequentially. Low energy Bluetooth uses shorter packets as compared to classical Bluetooth technology, thereby enabling less transmission time to send data, which also reduces power consumption. Generally, a low energy Bluetooth device may scan for another device, connect, authenticate, send data, and terminate connection in less than 3 ms. This short period of time enables minimal transceiver usage, which reduces power consumption (in addition to reduced peak power, and shorter packets).

As noted, directed connectable advertising is a standard advertising procedure that allows a device to address advertisements to a particular peer device in order to initiate a connection. This mode of advertising is desirable for use cases where the advertising device desires to connect only to a particular peer device. Embodiments described below aim to optimize directed connectable advertisement by a low energy Bluetooth device in order to reduce time it takes to link two devices.

Current Bluetooth low energy specifications dictate that three advertising channels be made available for advertising packets. Further, according to the Bluetooth low energy specification, the time between the start of two consecutive directed advertising packets transmitted on the same advertising channel is required to be 3.75 milliseconds or less and the device is also required to perform directed advertising for no longer than 1.28 seconds. These limitations make it more difficult for a scanning device to receive directed advertisements, for example if the scan interval used by the scanning device is greater than 1.28 seconds. In addition, the required time between advertising packet transmissions is very short, resulting in numerous advertisement transmissions and therefore significant power consumption during the advertising procedure.

In order to overcome these limitations of current low energy Bluetooth advertising, a directed connectable advertising mechanism that has more flexible scheduling of advertisement transmissions is provided. This system results in lower power consumption and improved likelihood of advertisement reception by scanning devices. Such a mechanism has certain link layer 312 parameters that are configured by the host 300. These parameters include:

- An advertising interval, which sets the time between groups of advertisement transmissions.
- An advertising window, which defines the duration of a group of advertisement transmissions. The advertising window is less than or equal to the advertising interval.
- An advertising attempt number, which sets the number of advertising intervals until advertising is stopped. The advertising attempts may be infinite, in which case the device will continue advertising until stopped by the host 300 or a connection is established.

An important feature of this mechanism is that it is compatible with the standard directed advertising procedures and requirements defined in the Bluetooth low energy specification. When the advertising window is set to 7.50 milliseconds or greater, then two or more consecutive directed advertising packets will be transmitted on the same channel within the window, meeting the consecutive packet transmission timing requirement (less than 3.75 ms between successive attempts) described above.

Figure 4:
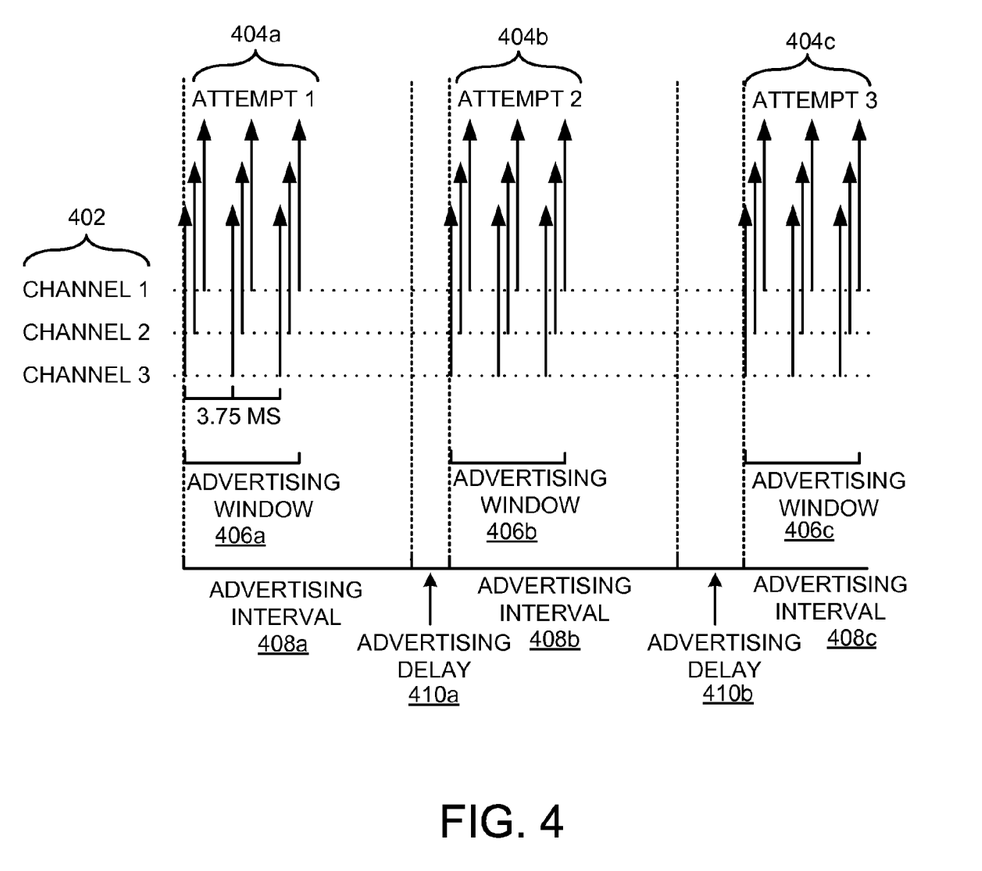
FIG. 4 is an example timeline illustration of advertisement transmissions by a Bluetooth low energy device, using a flexible scheduling mechanism, in accordance with some embodiments.

In some embodiments, the behavior of the standard directed advertising procedure can be emulated by configuring both the advertising interval and advertising window 406a to 1.28 seconds and configuring the advertising attempts to one.

FIG. 4 illustrates an example timeline of advertisement transmissions using this novel mechanism. In some embodiments, the link layer 312 enters the advertising state and starts advertisement transmissions at the beginning of the advertising interval 408a on each of the advertising channels 402 defined in the Bluetooth low energy specification. The time between consecutive directed advertising packets transmitted on the same advertising channel within the advertising window 406a is 3.75 milliseconds or less. Advertising continues for the duration of the advertising window 406a.

At the end of the advertising window 406a, the link layer 312 exits the advertising state, in some embodiments. The link layer 312 then waits for the end of the advertising interval 408a. At the end of the advertising interval, the link layer 312 waits for an advertising delay 410a, which is a pseudorandom value from 0 to 10 milliseconds (note the differences between the lengths of the first delay 410a versus the second delay 410b). One example of a pseudorandom delay generator would include a linear feedback shift register. Of course alternate pseudorandom generators could be employed, as is known in the art. In some alternate embodiments, the delay may be random rather than pseudorandom. In yet other embodiments, the delays may not be random at all and rather follow a set schedule of durations (deterministic). The advertising delay 410a helps prevent the unintended alignment of advertisement transmissions with other periodic transmissions, or interference that may occur on the advertising channels. The next advertising interval 408b begins after the advertising delay 410a.

At the start of the next advertising interval 408b, the link layer 312 reenters the advertising state and starts a second attempt 404b for the length of the second advertisement window 406b. In this example, the advertising attempts is set to three, therefore the sequence of events described above repeats three times.

Such a system and methods of advertising causes advertisements to be transmitted for shorter burst with pseudo-randomized intervals between the transmission periods (advertising windows). This results in a reduced overall time period that the advertisement is being transmitted, and thereby reduces the power consumption even further over current low energy protocols.

Figure 5:
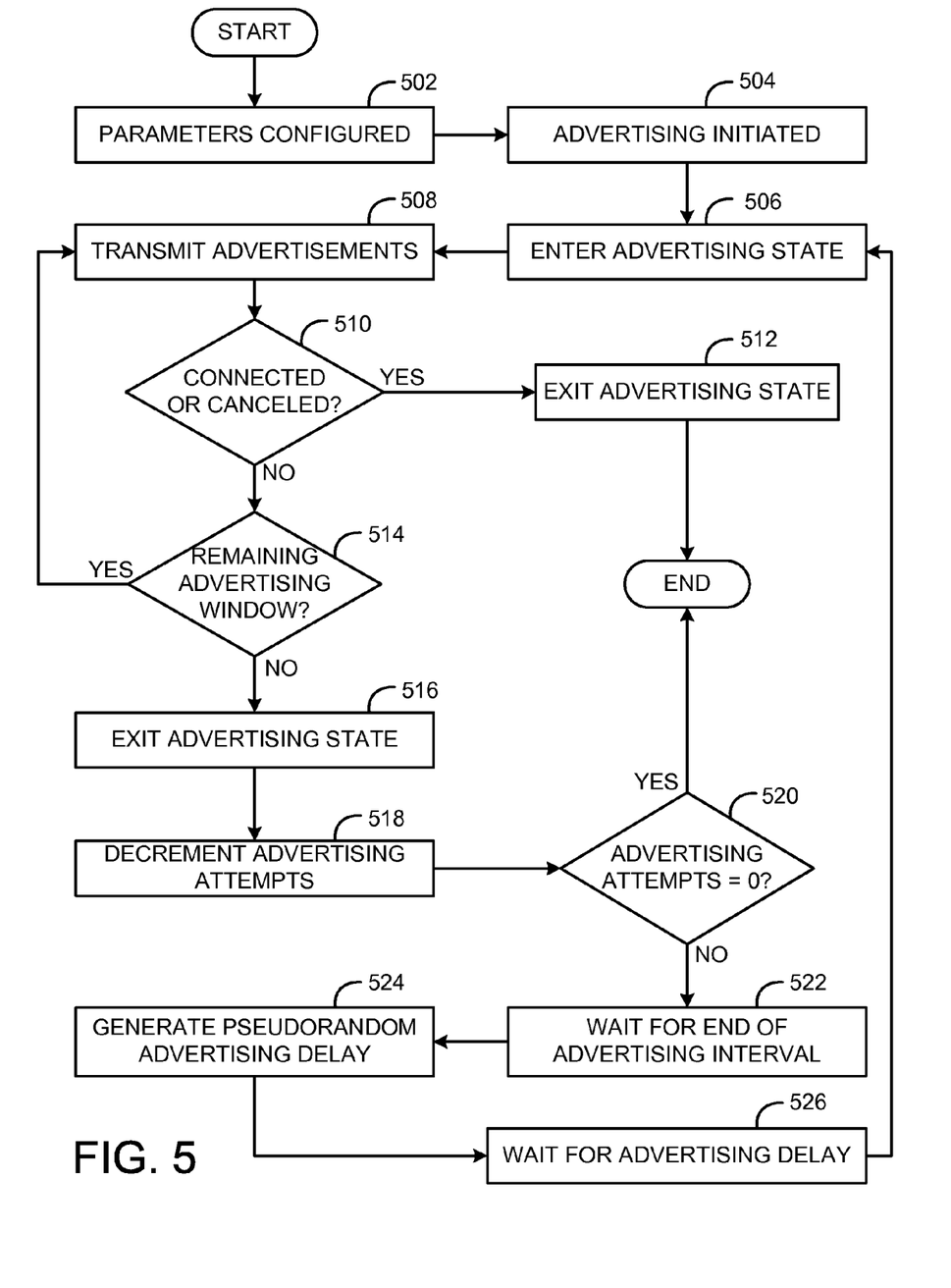
FIG. 5 is an example flow chart illustrating a process of advertisement transmissions using a flexible scheduling mechanism, in accordance with some embodiments.

FIG. 5 is a flowchart illustrating the process for this directed connectable advertising mechanism, in accordance with some embodiments. In this procedure, the host 300 configures the link layer 312's directed advertising parameters (at 502). These parameters may include of the advertising interval length, advertising window 406a length, and advertising attempt number.

Next, the host 300 commands the link layer 312 to initiate advertising (at 504). The link layer 312 enters advertising state (at 506) and transmits up to three advertisement packets (at 508), one on each utilized advertising channel. If a connection is established with a peer device, or if the host 300 cancels advertising (at 510), the link layer 312 exits the advertising state (at 512) and the operation ends.

Otherwise, the link layer 312 checks whether there is enough time to transmit additional advertising packets (at 514) before the end of the advertising window 406a. If there is time, the link layer 312 repeats the above process for transmitting advertisements (at 508). If there is not enough time remaining in the advertising window 406a, the link layer 312 exits the advertising state (at 516) and decrements the advertising attempts (at 518). If the advertising attempts is equal to zero (at 520), then the procedure ends. Otherwise, the link layer 312 waits until the end of the advertising interval (at 522). Then the link layer 312 calculates a pseudorandom advertising delay value (at 524) and waits for the advertising delay (at 526). Then the link layer 312 repeats the process described above for entering the advertising state (at 506) and transmitting advertising packets (at 508).

As previously noted, this optimization of advertising transmission reduces transceiver duty cycle by sending advertising packets for only a portion of the advertising interval. Longer advertising windows reduces power savings, but enables more "on air" time in which a connection may be made. Thus, a balance is made between length and number of advertising attempts in order to increase likelihood of establishing a connection, and yet minimizing power consumption. The randomized delay ensures that periodic interferences do not foul chances of connection. Likewise, the random delay also ensures that there is connectivity established with scanners who are scanning on a set interval.

III. Improved Scanning

According to the Bluetooth low energy specification, the timing of a scanning procedure performed by a device is configured by two parameters, the scan window and scan interval. The scan interval is the time between two scan attempts. The scan window is the time within the scan interval that the device enables its radio and listens for transmissions on advertising channels. The scan window is less than or equal to the scan interval. If the scan window is equal to the scan interval, then the device scans continuously.

The scan interval and scan window control how often the device's radio is active and therefore have a significant impact on power consumption. A larger scan window in relation to the scan interval keeps the radio active longer and uses more power. A smaller scan interval means scan attempts are performed more often and therefore uses more power. To reduce power consumption, it is desirable to increase the scan interval and decrease the scan window. However, with power consumption is balanced by total time scanning, which reduces the likelihood that the scanner will be active when an advertising attempt is made by another device. Thus, a balance between power consumption and likelihood of connection is made. This balance may be affected by device specifications, power consumption limitations, and urgency of rapid connection.

As described above, the scan procedure is periodic in nature with the radio listening for transmissions based on a scan interval. According to the Bluetooth low energy specification, the advertising is also periodic in nature, with advertisement transmissions occurring based on an advertising interval and a 0-10 millisecond pseudorandom advertising delay. When the advertising interval is large relative to the advertising delay, for example when the advertising interval is several hundred milliseconds, influence of the random delay is minimal and the advertising transmissions are more periodic in nature.

Since both the advertising and scanning procedures are periodic in nature, an inefficiency can occur when the scan interval and advertising interval are nearly equal or are multiples of each other, and the scan window never intersects with an advertisement transmission. This inefficiency can cause significant delays for a scanning device to receive an advertisement from an advertising device. This delay causes the advertiser to send more advertisement transmissions than would be required if a connection were formed earlier, and the scanner likewise needs to enable its radio more often. Thus, this inefficiency can negatively impact the power consumption of both the advertiser and scanner devices.

Figure 6:
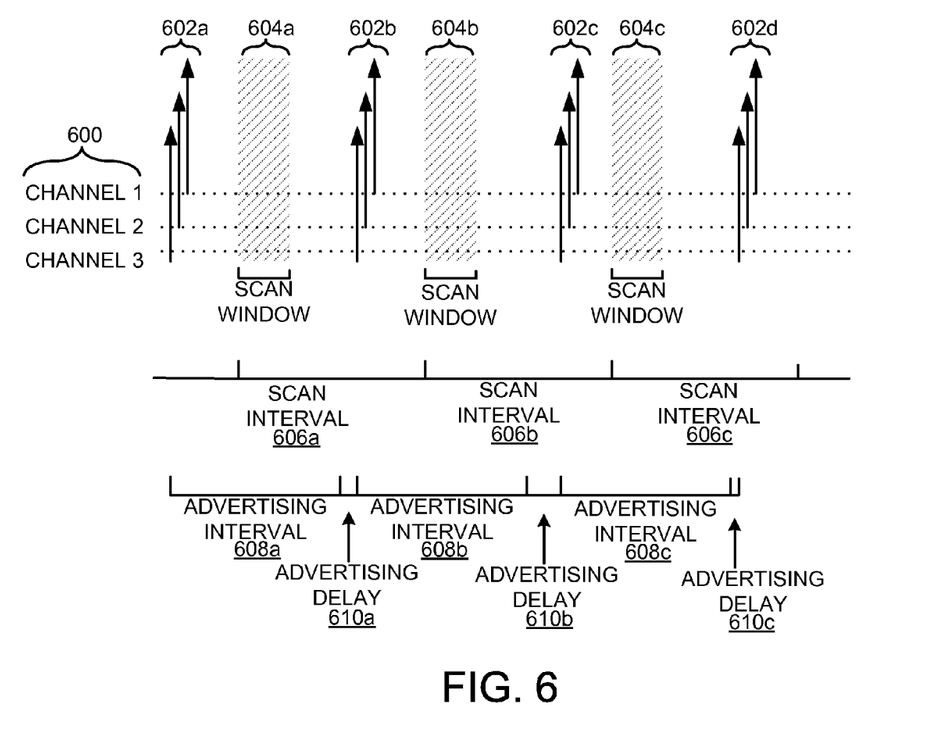
FIG. 6 is an example timeline illustration of conventional advertisement and scanning procedures for a pair of low energy Bluetooth devices, in accordance with some embodiments.

FIG. 6 illustrates this inefficiency by way of an example timeline. An advertising device starts advertisement transmission attempts 602a-d at the start of the advertising interval 608a-c on each of the three advertising channels 600 defined in the Bluetooth low energy specification. A scanning device enables its radio to listen for advertisements at the start of each scan interval 606a-c for the duration of the scan window 604a-c. In this example, each device starts its respective advertising or scanning procedure independently resulting in an incidental alignment between the start of the scan interval 606a and the start of the advertising interval 608a. This is a common scenario in the operation of actual Bluetooth low energy devices.

In this example, the scan window 604a-c happens to align such that it never intersects with any transmitted advertisement packet attempts 602a-d during the illustrated scan intervals 606a-c. Since the advertising delay 610a-c is small compared advertising interval 608a-c, and the scan interval 606a-c and advertising interval 608a-c are nearly equal, the likelihood of the scan window 604a-c intersecting with any transmitted advertisement packet attempt 602a-d is small. As a result, the scanning device will need to scan for a very long time to receive any advertisements, resulting in higher power consumption and a poor user experience.

In order to minimize or eliminate this possibility of periodic alignment between the scan interval and advertisement transmissions, a system and method of improved scanning is provided. Such a system and method introduces a random delay within each scan interval such that the scan window 604a-c starts at a random time within the scan interval 606a-c. This ensures the probability that the scan window 604a-c intersects with advertisement transmission attempts 602a-d is independent in each scan interval 606a-c.

Figure 7:
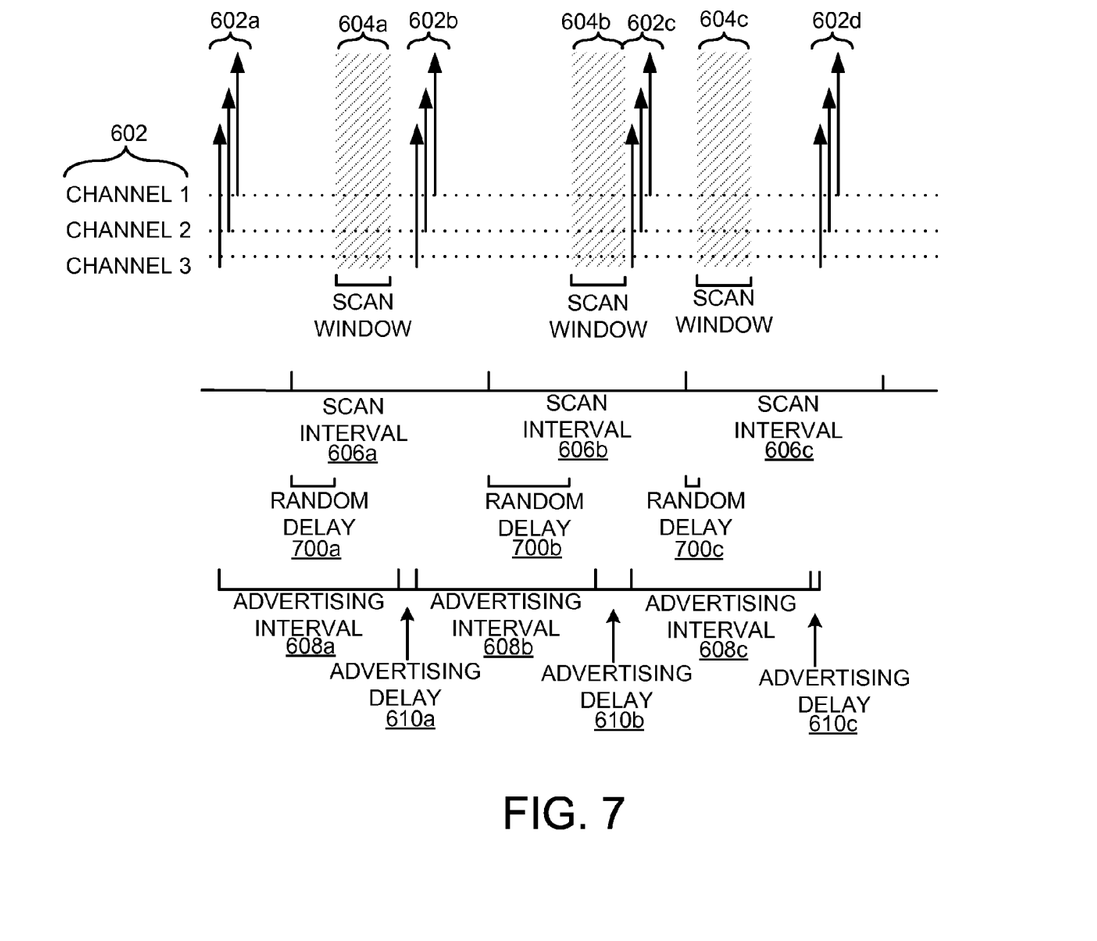
FIG. 7 is an example timeline illustration of an improved scanning procedure for a low energy Bluetooth device, in accordance with some embodiments.

FIG. 7 illustrates the operation of this scanning improvement, in accordance with some embodiments. In this example, a scanning device has a scan interval 606a-c that is nearly equal to the advertising interval 608a-c of the advertising device. At the start of each scan interval 606a-c the scanning device waits for a random delay 700a-c between zero and the difference between the scan interval 606a-c and the scan window 604a-c. Then the device enables its radio to listen for advertisement transmissions for the duration of the scan window 604a-c. Notice that any incidental alignment of the advertising interval 608a-c and scan interval 606a-c is now irrelevant as the scan window 604a-c is never aligned with the advertising interval.

Figure 8:
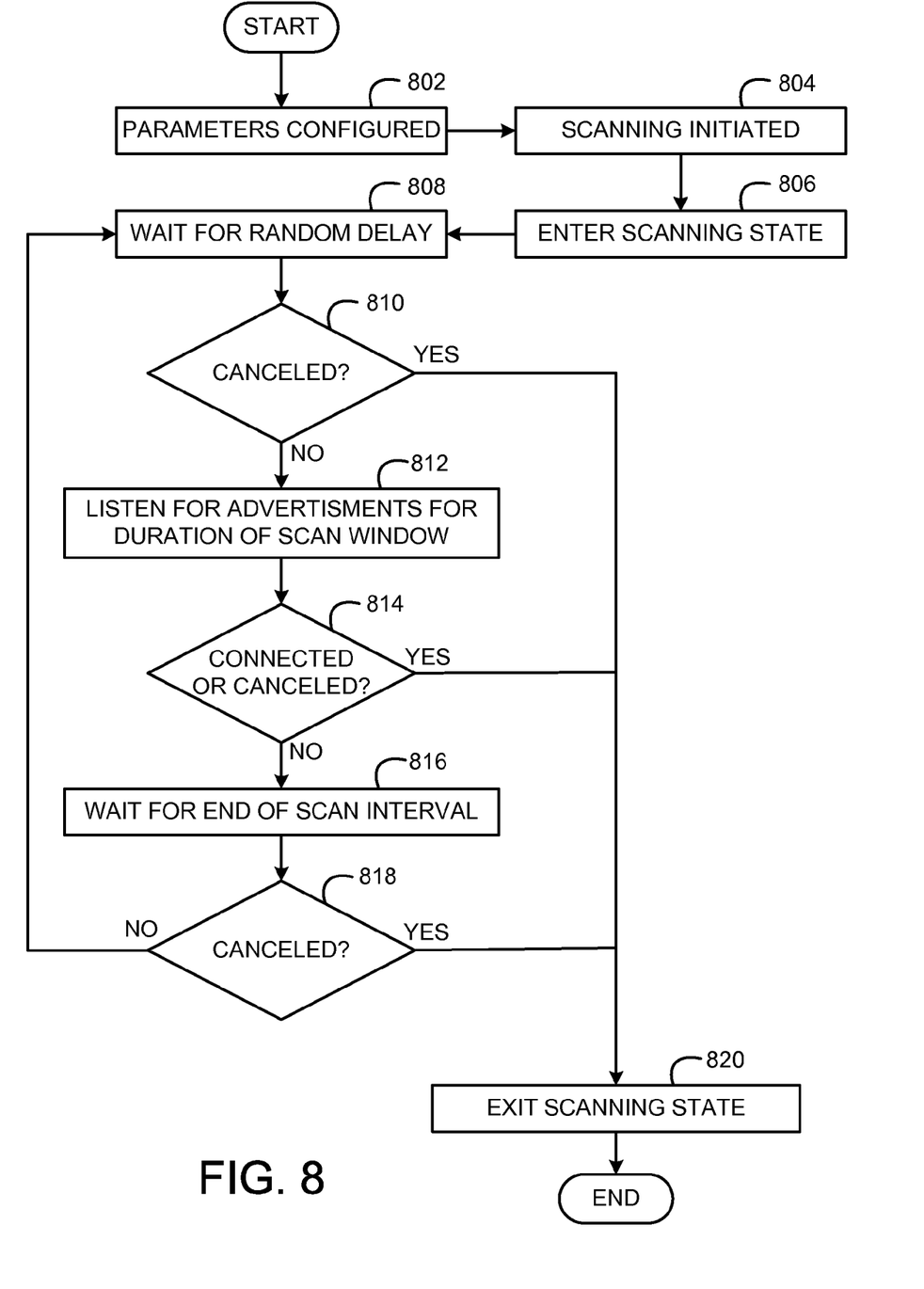
FIG. 8 is an example flow chart illustrating a process of an improved scanning mechanism, in accordance with some embodiments.

FIG. 8 is an example flow chart illustrating the process for this scanning mechanism. First, the host 300 configures the link layer's 312 scan parameters (at 802), consisting of the scan interval and scan window. Then the host 300 commands the link layer 312 to initiate scanning (at 804). The link layer 312 enters scanning state (at 806) and waits for a random delay (at 808). The random delay is generated by subtracting the length of the scanning window from the length of the scanning interval. This provides the longest time for a random delay. Then a randomized number between zero and the calculated maximum time is determined. This random number is the random delay for this scanning interval. In some embodiments, the random delay may instead be pseudo-randomized. In these embodiments, the random delay may be compared to the random delays of the preceding scanning intervals, and be biased against being too similar to the most recent scanning intervals. This further prevents inadvertent alignments that postpone a connection being made. Of course, any random or pseudorandom generator may be employed in some embodiments, as is applicable.

If the scanning procedure is canceled by the host 300 (at 810) while waiting for the random delay, then the link layer 312 exits the scanning state (at 820) and the procedure is complete. Otherwise, the link layer 312 enables the radio and listens for advertisement transmissions for the duration of the scan window (at 812).

If a connection is established with a peer device, or if the host 300 cancels scanning, (at 814) the link layer 312 exits the scanning state (at 820) and the procedure ends. Otherwise, the link layer 312 waits for the end of the scan interval (at 816). If the scanning procedure is canceled by the host 300 while waiting (at 818), then the link layer 312 exits the scanning state (at 820) and the procedure is complete. Otherwise, the link layer 312 repeats by calculating a new random delay and waits for the random delay (at 808) and the procedure continues.

The scanning mechanism described above can also be expanded to use multiple scan sub-windows with the total duration of all scan sub-windows equal to the duration of the scan window, with each scan sub-window preceded by a random delay. Such a system would further fragment the scan, and thereby provide greater scanning frequency, yet with the same total scanning duration.

The scanning mechanism described above can also be modified to stop and resume the scan window if the scan window conflicts with other scheduled high priority radio procedures, such as a data transfer with a peer device. In this case, the scan window would start after a random delay and continue until the start of the other scheduled procedure. If the other scheduled procedure completed before the end of the scan interval, then the link layer 312 would resume scanning for the remainder of the scan window.

The scanning mechanism described above could also operate such that if after calculating the random delay the link layer 312 determines the scan window will conflict with another high priority radio procedure, the link layer 312 will repeat the calculation of the random delay again until the scan window would no longer conflict with another procedure.

The scanning mechanism described above could also operate such that it begins the first scan window at the start of the first scan interval, and uses a random delay before the scan window in all subsequent scan intervals. This mode of operation increases the likelihood of receiving advertisements if the scanning device and advertising device start their respective procedures at approximately the same time. This can happen during the typical operation of Bluetooth low energy devices, for example when the data connection between two devices is lost and both devices attempt to reconnect to each other.

The scanning mechanism described above can be enabled or disabled in the link layer 312 by the host 300. When disabled, the link layer 312 scans using the standard scanning procedure defined in by the Bluetooth low energy specification, without the use of a random delay before the scan window. When the scanning mechanism is enabled, then other features of the mechanism can be configured by the host 300, including the number of scan sub-windows to use, if any; the method used to avoid conflicts with high priority radio procedures; and the use of a random delay in the first scan interval.

IV. Timing Communication

The application on a host 300 may need to broadcast dynamically changing data, such as sensor data, in advertisement packets. The standard host 300 procedures for setting the advertising data, configuring the advertising interval, and enabling advertising in the link layer 312 are defined in the Bluetooth low energy specification. Once advertising is enabled, the details of the advertising procedure, such as the timing of advertising transmissions, are controlled by the link layer 312. There is no interface or procedure defined in the Bluetooth low energy specification to communicate this sort of timing information from the link layer 312 to the host 300.

The application on a host 300 may need to perform periodic tasks while in a connection, such as performing a sensor measurement. During a connection, two devices maintain communication by periodically waking up to transmit and receive data at an interval known as the connection interval. The connection interval is determined by the two devices when the connection is established and the timing of the connection interval is controlled by the link layer 312. There is no interface or procedure defined in the Bluetooth low energy specification to communicate that the link layer 312 is waking up to transmit and receive data at a connection interval.

If a host 300 knows when advertisements are being transmitted, it can optimize its operations for lower power and better performance. For example, a temperature sensor application could use a message sent from the link layer 312 that precedes each advertisement transmission as a trigger to read the temperature and set the new value in the advertisement data. This eliminates the need to the application to maintain its own timer to periodically read the temperature, which uses memory and power. It also ensures that the time between the sensor being read and the sensor data being transmitted is very short, eliminating delayed or stale data.

Figure 9:
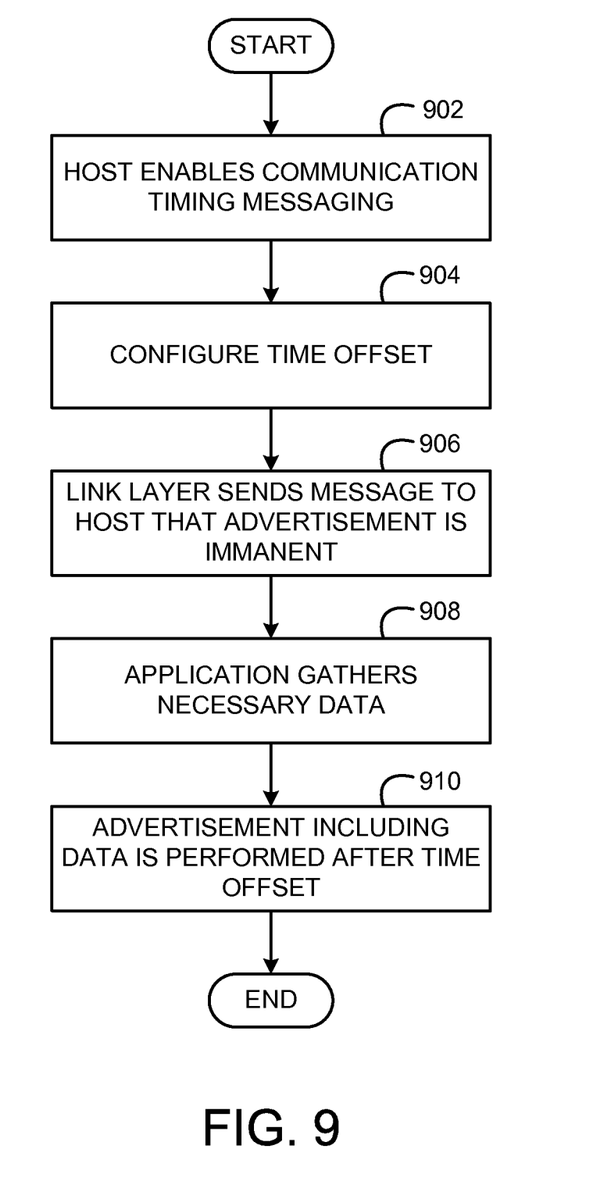
FIG. 9 is an example flow chart illustrating a process of handling timing in order to reduce power consumption, in accordance with some embodiments.

FIG. 9 provides an example flowchart for handling timing in order to reduce power consumption, in accordance with some embodiments. The process begins where the host 300 is able to enabled (at 902) or disabled timing communications. The host 300 also specifies a time offset (at 904) which may be positive or negative. When enabled, the link layer 312 sends a message to the host 300 at the time offset relative to the start of an advertisement transmission (at 906). For example, if the offset is −1 millisecond, the link layer 312 will notify the host 300 1 millisecond before the start of an advertisement transmission. The host 300 application may then utilize the timing message in order to collect data or perform a calculation (at 908). Then, when the advertisement is transmitted after the time offset, the gathered data may be included within the advertising transmission (at 910).

In sum, the present invention provides a system and methods for short range wireless communication based upon Bluetooth low energy specifications. Embodiments relate to mechanisms for improved advertisement and scanning which increase the likelihood of establishing a connection, and thereby reducing overall power consumption over known low energy Bluetooth protocols.

While this invention has been described in terms of several embodiments, there are alterations, modifications, permutations, and substitute equivalents, which fall within the scope of this invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for improving directed connectable advertising in a wireless device, the method comprising:
configuring a length of an advertisement interval, a length of an advertisement window, and a number of attempts, wherein the length of the advertisement window is shorter than the length of the advertisement interval;
transmitting an advertisement for the length of the advertisement window; and
decrementing the number of attempts, and if the number of attempts is greater than zero then:
calculating an advertising delay, wherein the advertising delay is a random or pseudorandom value, and wherein a series of advertising delays has a plurality of lengths;
retransmitting the advertisement for the length of the advertisement window after the end of the advertising interval and the advertising delay; and
if the number of attempts is not greater than zero then terminating transmission attempts.

2. The method as recited in claim 1, further comprising ending the transmitting if a connection is established or advertising is cancelled.

3. The method as recited in claim 1, wherein the advertising delay is calculated using a linear feedback shift register.

4. The method as recited in claim 1, wherein the length of the advertisement interval is no more than 1.28 seconds.

5. The method as recited in claim 1, wherein the advertising delay is between zero and ten milliseconds.

6. The method as recited in claim 1, wherein the method is for improving directed connectable advertising on a Bluetooth device.

7. The method as recited in claim 1, wherein the advertisement includes advertising packets.

8. The method as recited in claim 7, wherein transmitting the advertisement for the length of the advertisement window includes transmitting the advertising packets on three advertisement channels.

9. The method as recited in claim 8, wherein the advertising packets are transmitted with at most a 3.75 millisecond timing between consecutive advertising packet transmission.

10. The method as recited in claim 9, wherein advertising packets are transmitted consecutively until there is no longer enough time in the advertisement window to transmit another advertising packet.

11. An apparatus for improving directed connectable advertising in a wireless device, the apparatus comprising:
a host configured to set a length of an advertisement interval, a length of an advertisement window, and a number of attempts, wherein the length of the advertisement window is equal to or shorter than the length of the advertisement interval;
a transceiver configured to transmit an advertisement for the advertisement window length; and
a link layer configured to decrement the number of attempts, and if the number of attempts is greater than zero then:
calculate an advertising delay, wherein the advertising delay is a random or pseudorandom value, and wherein a series of advertising delays has a plurality of lengths;
instruct the transceiver to retransmit the advertisement for the length of the advertisement window after the end of the advertising interval and the advertising delay; and
if the number of attempts is not greater than zero then terminating transmission attempts.

12. The apparatus as recited in claim 11, wherein the link layer is further configured to end the transmitting if a connection is established or advertising is cancelled.

13. The apparatus as recited in claim 11, wherein the link layer includes a linear feedback shift register for calculating the advertising delay.

14. The apparatus as recited in claim 11, wherein the length of the advertisement interval is no more than 1.28 seconds.

15. The apparatus as recited in claim 11, wherein the advertising delay is between zero and ten milliseconds.

16. The apparatus as recited in claim 11, wherein the apparatus is for improving directed connectable advertising in a Bluetooth device.

17. The apparatus as recited in claim 11, wherein the advertisement includes advertising packets.

18. The apparatus as recited in claim 17, wherein the transceiver transmits the advertising packets on three advertisement channels.

19. The apparatus as recited in claim 18, wherein the transceiver transmits advertising packets with at most a 3.75 millisecond timing between consecutive advertising packets.

20. The apparatus as recited in claim 19, wherein the transceiver transmits advertising packets consecutively until there is no longer enough time in the advertisement window to transmit another advertising packet.

* * * * *